(12) United States Patent
Iwata et al.

(10) Patent No.: US 6,218,643 B1
(45) Date of Patent: Apr. 17, 2001

(54) POWER SUPPLYING APPARATUS FOR AUTOMOTIVE PART

(75) Inventors: Toshio Iwata; Kazutoshi Kaneyuki, both of Himeji (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 07/914,359

(22) Filed: Jul. 17, 1992

(30) Foreign Application Priority Data

| Jul. 18, 1991 | (JP) | 3-178173 |
| Jul. 19, 1991 | (JP) | 3-179698 |
| Jul. 22, 1991 | (JP) | 3-181146 |
| Jul. 23, 1991 | (JP) | 3-182447 |
| Jul. 24, 1991 | (JP) | 3-184304 |
| Jul. 24, 1991 | (JP) | 3-184305 |
| Jul. 24, 1991 | (JP) | 3-184306 |
| Jul. 25, 1991 | (JP) | 3-186026 |
| Jul. 25, 1991 | (JP) | 3-186027 |
| Jul. 25, 1991 | (JP) | 3-186028 |

(51) Int. Cl.$^7$ ................................................ H05B 1/02
(52) U.S. Cl. ...................... 219/202; 219/508; 219/501; 219/494
(58) Field of Search .................... 219/490, 494, 219/497, 501, 507, 508, 202, 203, 205; 123/142.5 E, 142.5 R (56) References Cited

U.S. PATENT DOCUMENTS

| Re. 33,343 | * | 9/1990 | Bitter et al. | 219/509 |
| 3,576,970 | * | 5/1971 | Cherry | 219/202 |
| 4,188,527 | * | 2/1980 | Follmer | 219/202 |
| 4,280,330 | * | 7/1981 | Harris et al. | 219/202 |
| 4,423,307 | * | 12/1983 | Kondo et al. | 219/202 |
| 4,780,618 | * | 10/1988 | Wareman et al. | 219/202 |
| 4,814,579 | * | 3/1989 | Mathis et al. | 219/202 |
| 4,884,013 | * | 11/1989 | Meuret et al. | 322/8 |
| 4,939,347 | * | 7/1990 | Masaka et al. | 219/492 |
| 5,013,994 | * | 5/1991 | Takatsuka | 219/203 |
| 5,025,136 | * | 6/1991 | Doege et al. | 219/202 |
| 5,063,513 | * | 11/1991 | Shank et al. | 219/202 |

FOREIGN PATENT DOCUMENTS

| 3801478 | 2/1989 | (DE) . |
| 3942165 | 6/1990 | (DE) . |
| 3942593 | 6/1991 | (DE) . |

OTHER PUBLICATIONS

Fachausgabe zur Krafthand, vol. 26, 45, Dec. 16, 1992, pp. 49–52.
Krafthand, vol. 7, Apr. 14, 1984, p. 450.
SAE Technical Paper Series Electrically–Heated Catalyst System Conversions on Two Current–Technology Vehicles—Mar. 1991.

* cited by examiner

*Primary Examiner*—Mark Paschall
(74) *Attorney, Agent, or Firm*—Sughrue, Mion, Zinn, Macpeak & Seas, PLLC (57) ABSTRACT

A power supplying apparatus for automotive parts can prevent not only wasteful power consumption even if an electric heater is short-circuited, but also any adverse effects on engine operation during an engine start-up operation. To this and, a heater 3 is connected to a power supply means P for heating the automotive parts. A switch 5 is connected between the power supply means P and the heater 3 for selectively switching on and off the power supply from the power supply means P to the heater.

20 Claims, 7 Drawing Sheets

POWER SUPPLYING APPARATUS FOR AUTOMOTIVE PART

BACKGROUND OF THE INVENTION

The present invention relates to a power supplying apparatus for supplying electric power to heating elements which heat various parts of an automobile and the like. More particularly, it relates to such a power supplying apparatus which is capable of preventing wasteful power consumption upon a failure such as short-circuiting in the heating elements.

In general, automotive parts are equipped with various heating elements which are supplied with electric power from a common power source in the form of a battery.

For example, when the temperature of intake air sucked into cylinders of an internal combustion engine is low, ignition of the intake air becomes rather difficult, so it is necessary to heat intake air for ensuring good ignition. In particular, with diesel engines, ignition becomes very difficult at the time of engine starting. To improve this situation, a heating element such as a glow heater is required. Also, a wind heater is used for defrosting the front windshield and the like of an automotive vehicle. Further, in cold weather, the function of a catalytic converter, which treats and purifies exhaust emissions from an internal combustion engine, is reduced or degraded due to low temperatures, so in this case, a heater is required to heat the catalytic converter.

The power consumption of these various kinds of heating elements usually reaches a maximum of several kilo watts. Thus, considering that the source voltage of a battery for automotive use is generally 12 volts, current of about 400 amperes is required, thus imposing a high load on the battery.

Figure 14:
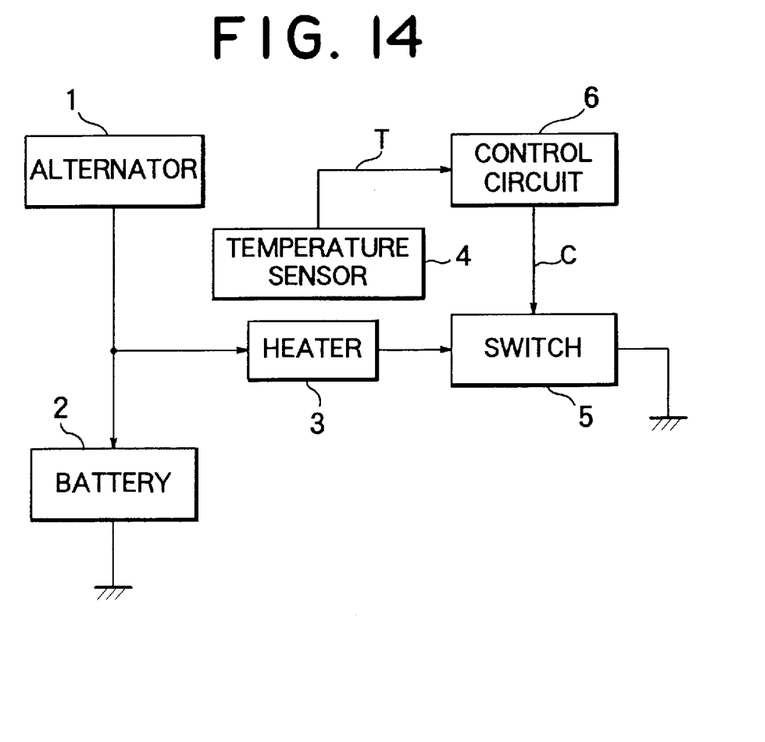
FIG. 14 shows a typical example of a power supplying apparatus for automotive parts.

FIG. 14 illustrates in block form a typical example of a power supplying apparatus for supplying electric power to various kinds of automotive heating elements. In this figure, the apparatus illustrated includes an AC generator in the form of an alternator 1 having a rectifier incorporated therein, and a battery 2 adapted to be charged by the alternator 1. The AC generator 1 is operatively connected with an unillustrated engine so that it is driven to rotate by the engine. The alternator 1 and the battery 2 together constitute a source of electricity for supplying electric power to a heating element In the form of an electric heater 3.

The heater 3 can be mounted on an automotive part such as a catalytic converter and the like for heating it. The heater 3 is electrically connected to a junction between the alternator 1 and the battery 2. A temperature sensor 4 is provided for sensing the temperature of the heating element, i.e., the ambient temperature of the heater 3. A control switch 5 is connected at one end thereof to the heater 3 and at the other end to ground for selectively switching on and off the power supply to the heater 3. A control circuit 6 is connected to the temperature sensor 4 and the control switch 5 for generating a control signal C to the control switch 5 based on an output signal T from the temperature sensor 4. Though not illustrated, a drive circuit is connected between the control circuit 6 and the control switch 5 for generating an operation voltage for the switch 5 based on the output voltage of the power supplying means in response to the control signal C from the control circuit 6.

The operation of this apparatus will now be described below. First, during normal operation of the engine, the alternator 1 is driven to rotate by the engine and generate electric power, e.g., three-phase AC voltage, which is converted by the built-in rectifier into a DC voltage of an appropriate value, e.g., 12 volts. The DC voltage is then output from the alternator 1 to the battery 2.

If the temperature of the unillustrated automotive part such as a catalytic converter goes low for some reason during operation or non-operation (stoppage) of the engine, the temperature sensor 4 senses such a situation and generates an output signal T indicative of the fact that the sensed temperature is below a predetermined lower limit. In this case, in response to the output signal T from the temperature sensor 4, the control circuit 6 generates a control signal C for closing or turning on the control switch 5. As a result, the heater 3 is supplied with electric power from the power source, i.e., from the alternator 1 and the battery 2, thereby properly heating the catalytic converter to a temperature above the predetermined lower limit. After the lapse of a predetermined time at which a sufficient rise in the temperature of the catalytic converter is expected, the control circuit 6 opens or turns off the control switch 5, thus cutting off the power supply to the heater 3. In this manner, the intended function or performance of the catalytic converter can be ensured.

In this regard, the suitable temperature of the catalytic converter at which catalyst therein is effective to function usually ranges from 350° C. to 400° C., and the temperature of exhaust gases during engine operation is at about 600° C. Accordingly, the power supply to the heater 3 is carried out only for a short time during cold engine starting.

However, when electric power is supplied to the heater 3, the output voltage of the battery 2 gradually falls and finally gets short of a minimum voltage required for normal operation of the engine. As a result, the output torque of the engine may be accordingly decreasing, thus resulting in reduction in the running performance and acceleration performance. In particular, since the engine load becomes high at the time of engine starting, if the power supply to the heater 3 is effected prior to engine starting, the battery is excessively exhausted, making it difficult or impossible to start the engine, or reducing the running and acceleration performance. In addition, the charging capability of the alternator 1 and the rechargeable capacity of the battery 2 are limited, so the recovery time of the battery 2 (i.e., the time required for charging the battery 2 to the initial or fully charged level) increases.

In particular, after aging degradation and excessive discharge of the battery 2 or in the cold state of the battery 2, the rechargeable capacity of the battery 2 degrades, so the battery 2 takes a lot of time for recovery.

Moreover, in the event that the catalytic converter is at a remarkably low temperature, it will take a long time to sufficiently heat the catalytic converter to a temperature above a certain activation temperature level with use of the battery 2 alone. Still further, in order to supply a desired amount of electric power (i.e., several kilowatts) to the heater 3, a large current (e.g., current of about 400 amperes for the battery voltage of 12 volts) is needed, so the required current ratings for the control switch 5 and wiring accordingly increase.

Since the control switch 5 is turned off after the lower limit temperature for the catalytic converter is reached, if the atmospheric temperature is very low, the temperature of the catalytic converter rapidly falls below the lower limit immediately after the power supply to the heater 3 has been cut off, thus resulting in frequent on/off operations of the control switch 5.

Moreover, upon start of the power supply to the heater 3, the voltage of the battery 2 momentarily falls. Therefore, particularly in cases where the capacity of the battery 2 is low due, for example, to excessive discharge and the like, the battery 2 may have an output voltage less than a threshold voltage which is required for driving the control switch 5 on and off in response to a control signal C from the control circuit 6, thus leaving the control switch 5 in the off mode.

Furthermore, during engine cranking in the engine start-up operation, the engine load becomes high so that it power is simultaneously supplied to the heater 3 and an engine control system, the output voltage of the battery 2 abnormally falls, thus giving rise to a fear that the engine can not be successfully started up.

On the other hand, if the heater 3 has been short-circuited, e.g., grounded due to some trouble, power is continuously supplied to the heater 3 irrespective of the on or off condition of the control switch 5, thus resulting in useless consumption of electric power.

SUMMARY OF THE INTENTION

The present invention is intended to overcome the above-mentioned problems encountered with the aforesaid power supplying apparatus.

An object of the invention is to provide a power supplying apparatus for automotive parts which can prevent wasteful power consumption even if a heating element is short-circuited.

Another object of the invention is to provide a power supplying apparatus for automotive parts which can prevent any adverse effects on engine operation during an engine start-up operation.

A further object of the invention is to provide a power supplying apparatus for automotive parts which can swiftly heat automotive parts in a short time in an efficient manner.

A still further object of the invention is provide a power supplying apparatus for automotive parts which can ensure proper operation of a control switch even when electric power is supplied to a heating element.

A yet further object of the invention is to provide a power supplying apparatus for automotive parts which can prevent an excessive reduction In the output voltage of a battery even if electric power is supplied to a heating element, thereby ensuring proper engine starting operation at any time.

A further object of the invention is to provide a power supplying apparatus for automotive parts which can shorten the recovery time of a battery.

According to one aspect of the invention, there is provided a power supplying apparatus for automotive parts comprising: power supply means; heating means connected to the power supply means for heating the automotive parts; a first switch connected between the power supply means and the heating means for selectively switching on and off the power supply from the power supply means to the heating means.

The power supplying apparatus may further comprises control means for controlling the first switch in such a manner that the first switch is turned off for preventing the power supply from the power supply means to the heating means at the time of engine cranking.

In one form, the power supply means comprises a generator being driven by an engine for generating electric power; and power storage means connected to the generator so as to be thereby charged during engine operation. The heating means is connected through the first switch to the generator and to the power storage means.

In another form, the power supply means comprises: a generator being driven by an engine for generating electric power; first and second power storage means connected to the generator so as to be thereby charged during engine operation, the first power storage means being connected to the generator and to the heating means through the first switch, the second power storage means being connected to the heating means through the first switch; and a second switch connected between the generator and the second power storage means and between the first power storage means and the first switch for controlling electrical connection therebetween, the second switch being controlled by the control means.

In one form, the second switch comprises a cut-off switch which is switched off by the control means to cut off electrical connection between the first power storage means and the heating means during engine cranking.

In another form, the second switch comprises a change-over switch which is selectively switched over by the control means between a first condition in which the first and second power storage means are connected in series to each other, and a second condition in which the first and second power storage means are connected in parallel to each other.

In on form, the change-over switch is controlled by the control means such that it takes the first condition when the temperature of the automotive parts is less than a predetermined value, and the second condition when the temperature of the automotive parts exceeds the predetermined value.

In another form, the change-over switch is controlled by the control means such that it takes the first condition when the required power of the heating means is equal to or less than a predetermined value, and the second condition when the required power is greater than the predetermined value.

The power supplying apparatus may further comprises amplifying means connected between the control means and the first switch for amplifying the control signal supplied from the control means to the first switch.

In one form, the amplifying means comprises: a drive circuit connected between the control means and the first switch for turning the first switch on in response to the control signal from the control means, the drive circuit being operated by an output voltage of the power supply means; and a voltage-raising circuit connected between the power supply means and the drive circuit for raising the output voltage of the power supply means fed to the drive circuit.

According to another aspect of the invention, there is provided a power supplying apparatus for automotive parts comprising: a first generator and a second generator being both driven by an engine for generating electric power; first and second power storage means connected to the first and second generators, respectively, so as to be thereby charged during engine operation; heating means connected to the second generator and the second power storage means for heating the automotive parts; a switch connected between the heater and the second generator and between the heater and the second power storage means for selectively switching the power supply to the heating means on and off; and control means connected to the switch for selectively turning the switch on and off in response to power requirement of the heating means.

Preferably, the output power of the second generator is greater than that of the first generator and the output power of the second power storage means is greater than that of the first power storage means.

In one form, the second power storage means is separated from the first generator and the first power storage means.

In another form, the second power storage means is connected in series to the first power storage means and also to the first generator so as to be thereby charged.

In a preferred form, the first and second generators are formed into an integral unit.

According to a further aspect of the invention, there is provided a power supplying apparatus for automotive parts comprising: a generator being driven by an engine for generating an AC output voltage; first power storage means connected to the generator so as to be thereby charged during engine operation; amplifying and rectifying means connected to the generator for amplifying and rectifying the AC output voltage of the generator; second power storage means connected to the amplifying and rectifying means so as to be thereby charged; heating means connected to the amplifying and rectifying means and the second power storage means for heating the automotive parts; a switch connected between the heater and the amplifying and rectifying means and between the heater and the second power storage means for selectively switching the power supply to the heating means on and off; and control means connected to the switch for selectively turning the switch on and off in response to power requirement of the heating means.

In a preferred form, the second power storage means is connected in series to the first power storage means and to the generator so as to be thereby charged.

Preferably, the control means includes voltage-controlling means which is connected to the amplifying and rectifying means for controlling the output voltage thereof such that the output voltage of the amplifying and rectifying means is higher than the output voltage of the second power storage means by a predetermined value when the latter is being charged.

According to a still further aspect of the invention, there is provided a power supplying apparatus for automotive parts comprising: a generator being driven by an engine for generating an AC voltage; first power storage means connected to the generator so as to be thereby charged during engine operation; amplifying means connected to the first power storage means for amplifying the output voltage thereof; second power storage means connected to the amplifying means so as to be thereby charged; heating means connected to the amplifying means and the second power storage means for heating the automotive parts; a switch connected between the heater and the amplifying means and between the heater and the second power storage means for selectively switching the power supply to the heating means on and off; and control means connected to the switch for selectively turning the switch on and off in response to power requirement of the heating means.

In a preferred form, the control means includes voltage-controlling means which is connected to the amplifying means for controlling the output voltage thereof such that the output voltage of the amplifying means is higher than the output voltage of the second power storage means by a predetermined value when the latter is being charged.

The above and other object, features and advantages of the invention will be readily apparent from the following detailed description of preferred embodiments of the invention when read in conjunction with the accompanying drawings.

BRIEF DESCRIPTION OF THE DRAWINGS

In the drawings, the same symbols identify the same or corresponding parts or elements.

DESCRIPTION OF THE PREFERRED EMBODIMENTS

Preferred embodiments of the invention will now be described in detail while referring to the accompanying drawings.

Figure 1:
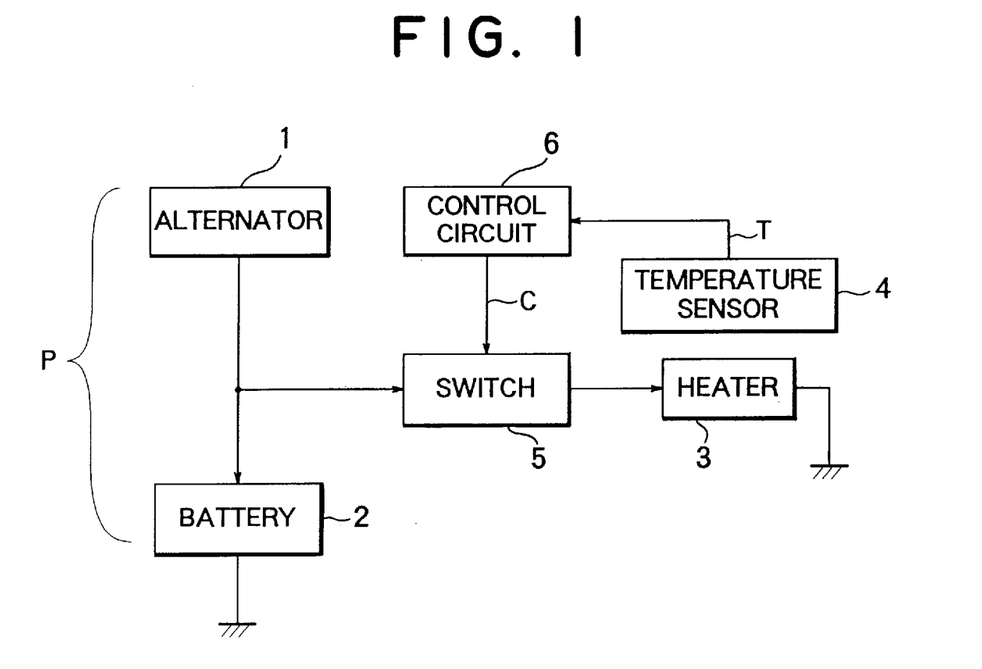
FIG. 1 is a block diagram of a power supplying apparatus for automotive parts in accordance with one embodiment of the invention.

Referring to the drawings and first to FIG. 1, there is illustrated a power supplying apparatus for automotive parts constructed in accordance with a first embodiment of the invention. In this embodiment, the power supplying apparatus comprises a power supply means P, a heating means in the form of an electric heater 3 connected to the power supply means P for heating an unillustrated automotive part mounted on an automotive vehicle, a first switch 5 in the form of an on-off switch connected between the power supply means P and the heating means 3 for selectively switching on and off the power supply from the power supply means P to the heater 3. The power supply means P comprises a first generator in the form of a first alternator 1 which is driven by an unillustrated engine of the automotive vehicle for generating electric power, and a first power storage means in the form of a first battery 2 which is mounted on the automotive vehicle and which is connected to the alternator 1 so as to be thereby charged during engine operation. A temperature sensor 4 is disposed on or near the automotive part for sensing the temperature thereof, and it generates an output signal T if the temperature as sensed is lower than a predetermined value. A control means in the form of a control circuit 6 is connected to receive the output signal T from the temperature sensor 4 for controlling the first switch 5 based thereon.

As can be readily seen from a comparison between FIGS. 1 and 14, according to this embodiment, the heater 3 is connected to the generator 1 and to the battery 2 through the first switch 5 which is controlled by the control circuit 6 in the following manner.

When the temperature of the automotive part such as a catalytic converter, which purifies the exhaust gases emitted from the automotive engine, is not low (i.e., higher than a predetermined value), no output signal T is generated by the temperature sensor 4, and hence the control circuit 6 generates a control signal C in the form of an off signal to the switch 5 which is thereby turned off. Thus, in this state, if the heater is accidentally short-circuited for some reason, no power is supplied from the power supply means P to the heater 3, thereby preventing wasteful power consumption. As a practical matter in this situation, however, the short-circuiting of the heater 3 is an abnormality which should be remedied. Thus, though not illustrated, the heater 3 is provided with a short-circuit sensor for sensing a short-circuiting current in the heater 3, so that if the sensor senses this, an unillustrated alarm is actuated to indicate such an abnormality.

Figure 2:
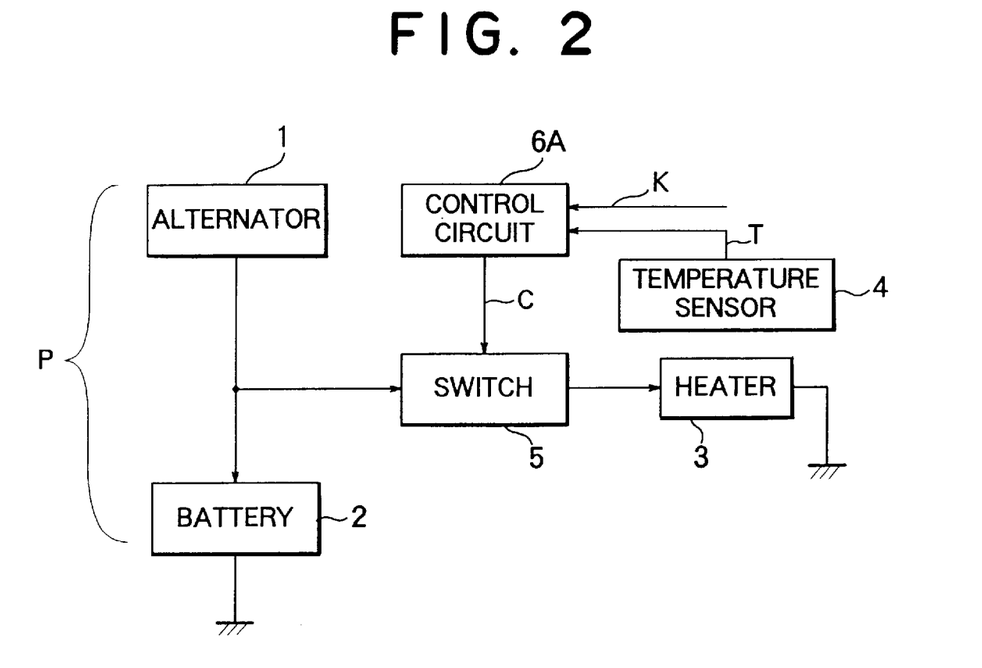
FIG. 2 is similar to FIG. 1, but showing a modified form of the FIG. 1 embodiment.

FIG. 2 illustrates a second embodiment of the invention which is substantially similar to the first embodiment of FIG. 1 except for the fact that a control circuit 6A is supplied with a cranking signal K from an unillustrated cranking sensor in addition to the output signal T from the temperature sensor 4. The cranking sensor senses engine cranking, for example, a switch-on state of a key switch, and generates a corresponding cranking signal K. In this embodiment, upon receipt of a cranking signal K, the control circuit 6A generates a control signal C in the form of an off signal irrespective of whether the temperature sensor 4 generates an output signal T, so that the switch 5 is thereby turned off, cutting off the power supply from the power supply means P to the heater 3. Accordingly, during engine cranking, the battery 2 is prevented from discharging to the heater 3, whereby the voltage of the battery 2 can be maintained at an appropriate level for proper operation of an unillustrated starter motor, thus ensuring reliable engine starting. After the engine has been started, the cranking sensor generates no cranking signal K, so the control circuit 6A generates a control signal C based on a temperature signal T from the temperature sensor 4 to control the switch 5 as in the FIG. 1 embodiment.

Figure 3:
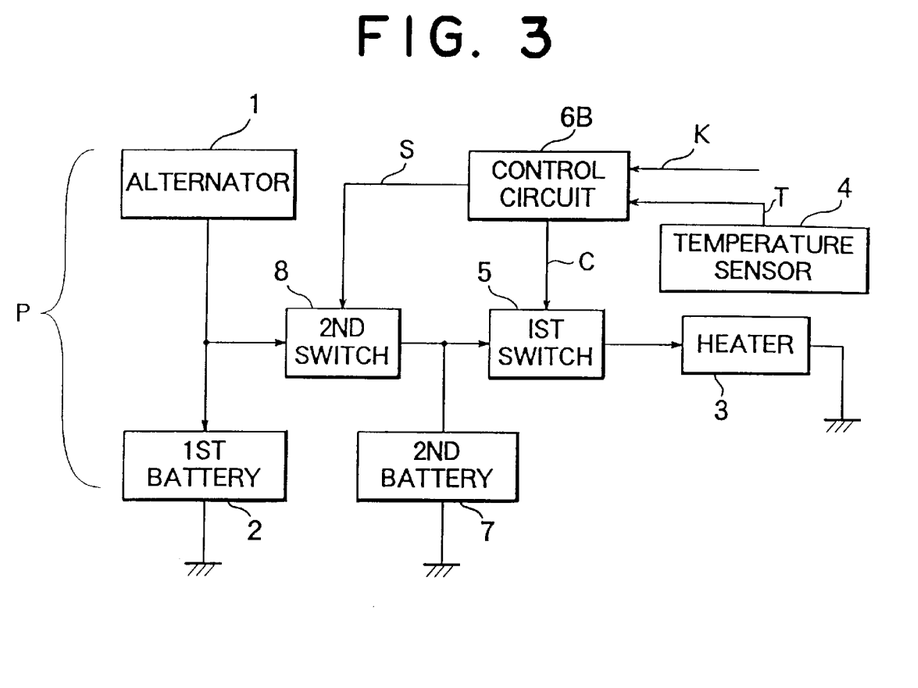
FIG. 3 shows a further embodiment of the invention.

FIG. 3 illustrates a third embodiment of the invention. This embodiment is substantially similar to the embodiment of FIG. 2 except for the following. Namely, in this embodiment, the power supply means P comprises a generator in the form of an alternator 1, and a first and a second power storage means in the form of a first or main and a second or auxiliary battery 2, 7 connected to the alternator 1 so as to be thereby charged during engine operation. A second switch in the form of a cut-off or interrupt switch 8 is connected between the alternator 1 and the second battery 7 and between the first battery 2 and a first switch in the form of an on-off switch 5 for controlling electrical connection therebetween. Thus, the second switch 8 is connected in parallel to the first battery 2 and in series to the alternator 1 through the second switch 8, and it is controlled by a cut-off signal, which is generated by a control means 6B based on a cranking signal K from an unillustrated cranking sensor for selectively disconnecting the second battery 7 from the alternator 1 and the first battery 2. The first switch 5 is controlled by a control signal C, which is generated by the control-circuit 6B based on a temperature signal T from a temperature sensor 4, to selectively control the power supply from the second battery 7 to the heater 3 as well as the power supply from the alternator 1 and the first battery 2 via the second switch 8.

The operation of this embodiment is as follows. When the temperature of an automotive part such as a catalytic converter, which is to be heated by the heater 3, is not low (i.e., higher than a predetermined value), no output signal T is generated by the temperature sensor 4, and hence the control circuit 6B generates a control signal C in the form of an off signal to the first switch 5 which is thereby turned off.

On the other hand, when the temperature of the automotive part falls below the predetermined value, the temperature sensor 4 generates an output signal T, based on which the control circuit 6B generates a control signal C In the form of an on signal to the first switch 5 which is thereby closed. As a result, electric power is supplied from the second battery 7 to the heater 3 via the first switch 5 irrespective of the condition of the second switch 8.

Further, upon receipt of a cranking signal K indicative of engine cranking, the control circuit a generates a cut-off signal S to the second switch 8 which is thereby turned off, disconnecting the second battery 7 and the heater 3 from the alternator 1 and the first battery 2. As a result, the load on the alternator 1 and the first battery 2 is reduced, allowing, for example, that the first battery 2 supplies electric power to an unillustrated starter motor alone. Thus, during engine cranking, the output voltage of the first battery 2 does not fall excessively or abnormally, ensuring proper engine starting. At this time, the second battery 7 continues to supply power to the heater 3 via the first switch 5, so that the heater 3 can properly heat the automotive part to above a certain required temperature, posing no problem at all.

When a predetermined time has elapsed after the completion of engine starting, the unillustrated cranking sensor senses no cranking current and generates no output signal. As a result, the control circuit 6B generates no cut-off signal S whereby the second switch 8 is turned on to connect the second battery 7 and the heater 3 to the alternator 1 and the first battery 2. In this state, power is supplied from the alternator 1 and the first battery 2 in addition to the second battery 7, thereby substantially increasing the heating ability or performance of the heater 3. As a result, the automotive part can be efficiently heated to the required temperature in a short time. After the automotive part reaches the required temperature, the temperature sensor 3 on longer generates an output signal T and hence the first switch 5 is turned off by the control circuit 6B to stop the power supply to the heater 3.

When the engine is out of operation, the alternator 1 generates no output power, and it is undesirable that the second battery 7 be connected to the first alternator 1 and the first battery 2. To this end, when the engine is stopped, the control circuit 6B generates a cut-off signal S to turn the second switch 8 off.

Figure 4:
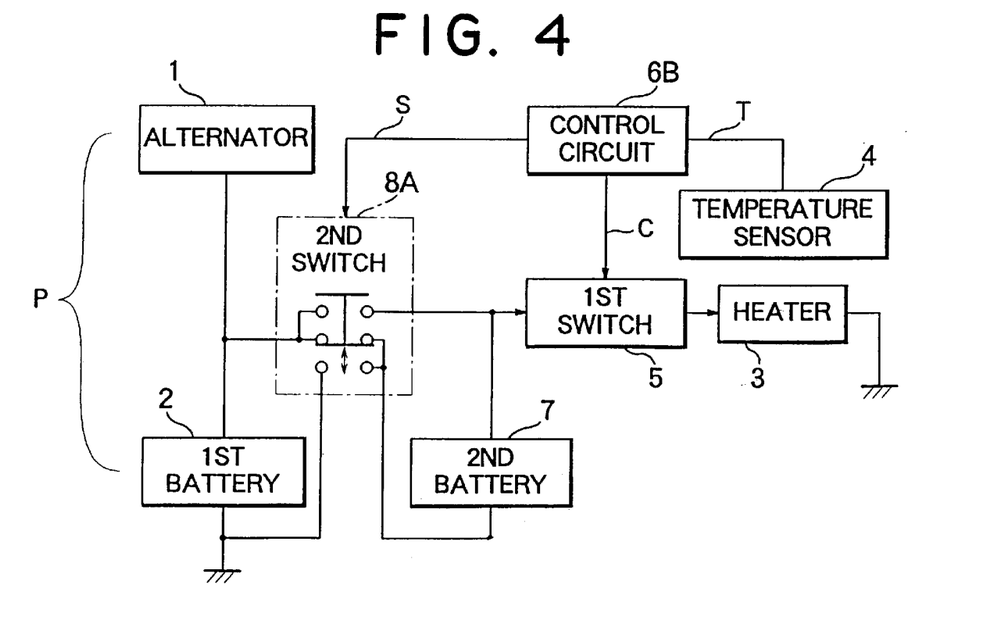
FIG. 4 shows a still further embodiment of the invention.

FIG. 4 illustrates a fourth embodiment of the invention. This embodiment is substantially similar to the embodiment of FIG. 3 except for the fact that a second switch 8A comprises a change-over switch instead of the cut-off switch 8 of FIG. 3. The change-over switch 8A is controlled by the control circuit 6B based on an output signal T from the temperature sensor 4 to selectively connect the alternator 1 and the first battery 2 to the second battery 7 or to the heater 3 via the first switch 5. Thus, in this embodiment, based on the temperature signal T from the temperature sensor 4, the control circuit 6B generates a control signal C to close the first switch 5 for supplying electric power to the heater 3. In this regard, in an early stage of the power supplying period, the control circuit 6B generates a change-over signal S to the change-over switch 8A so that the switch 8A is changed over to a first condition in which the alternator 1 and the first battery 2 are both connected in series to the second battery 7, as shown in FIG. 4, thus increasing the power supply to the heater 3. Subsequently, when the temperature of the unillustrated automotive part heated by the heater 3 reaches a predetermined value which is lower than a prescribed temperature at which the first switch 5 is tuned off, the control circuit 6B generates no change-over signal S whereby the change-over switch 8A is changed over to a second condition in which the alternator 1 and the first battery 2 are both connected in parallel to the second battery 7, reducing the power supply to the heater 3. Specifically, let us assume that the output voltages of the first and second batteries 2, 7 are both at 12 volts. In this case, at the early stage of the power supply, the heater 3 is supplied with a total voltage of 24 volts with the assumption that current is constant. As a result, the temperature of the automotive part heated by the heater 3 goes up to a required level in a short time, i.e., two times faster than the case in which the heater is supplied by the second battery 7 alone. Thus, due to the increased or doubled voltage supplied to the heater 3, the current required to produce a power of several kilo watts can be as small as around 200 amp. This allows a considerable reduction in the required current rating of wiring connecting between various component elements and hence substantial improvement in current transmission efficiency. Moreover, once the heater temperature reaches the predetermined value, the change-over switch 8 is switched into the second condition, so that the heater 3 is supplied with a relatively low voltage of 12 volts to keep the temperature of the automotive part at a substantially constant level. This serves to optimize and reduce the total power supply to the heater 3. In this manner, the change-over switch 8A can be changed between the first and second conditions in dependence on the power requirement of the heater 3.

Figure 5:
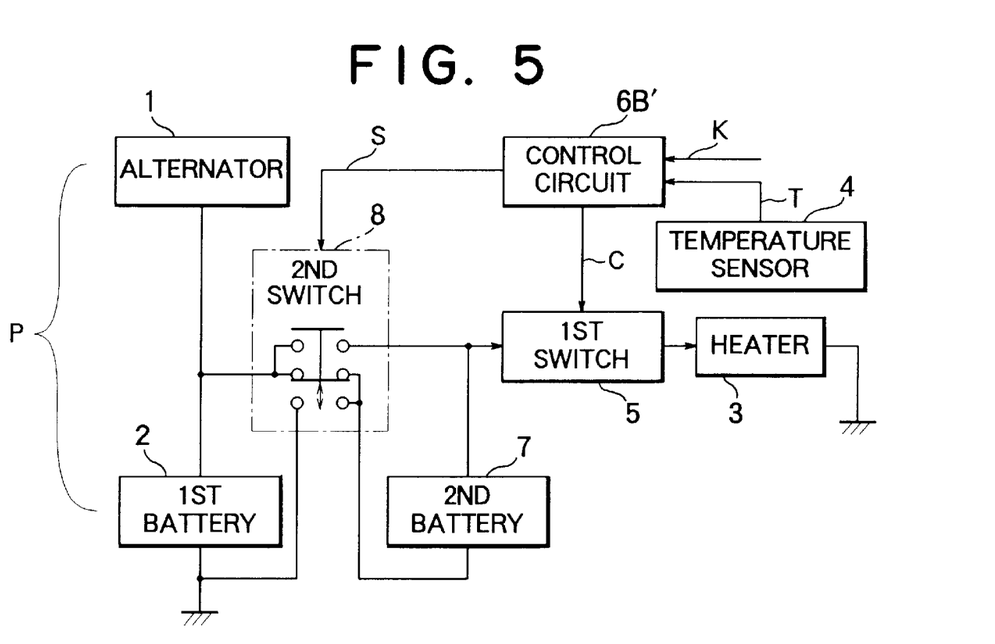
FIG. 5 is similar to FIG. 4, but showing a modified form of the FIG. 4 embodiment.

FIG. 5 illustrates a fifth embodiment of the invention which is substantially similar to the embodiment of FIG. 4 except in that when the engine is cranking, a cranking signal K is supplied to the control circuit 6B, as in the embodiment of FIG. 2. In this embodiment, when the control circuit 6B receives a cranking signal K indicative of engine cranking from an unillustrated cranking sensor, it generates a control signal C in the form of an off signal whereby the first switch 5 is turned off, cutting off all the power supply from the first and second batteries 2, 7 and the alternator 1. Thus, as in the FIG. 2 embodiment, the load on the alternator 1 and the first battery 1 is reduced, while preventing the first battery 2 from discharging to the heater 3 during engine cranking. Other than the above, this embodiment is the same as the embodiment of FIG. 4.

Figure 6:
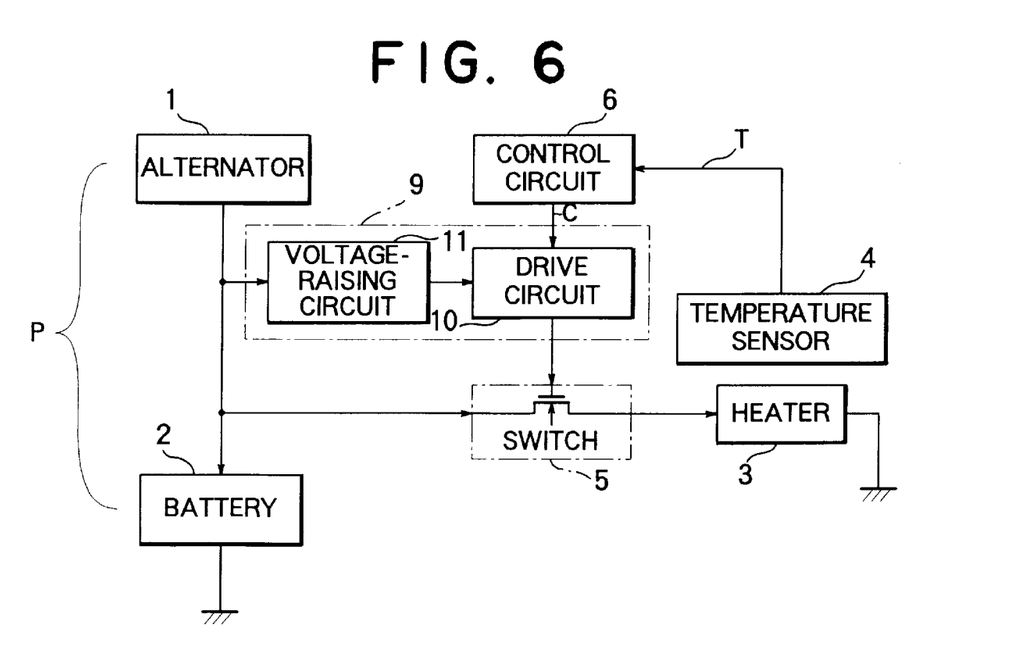
FIG. 6 shows a further embodiment of the invention.

FIG. 6 illustrates a sixth embodiment of the invention. This embodiment is substantially similar to the first embodiment of FIG. 1 except for the following. An amplifying means, generally designated at reference numeral 9, is connected between the control circuit 6 and the first or control switch 5 in the form of an N-type MOSFET for amplifying a control signal C supplied from the control circuit 6 to the control switch 5. The amplifying means 9 is constructed as follows. A drive circuit 10 is connected between the control circuit 6 and the first switch 5 for turning the first switch 5 on in response to a control signal C from the control circuit 6. The drive circuit 10 is operated by an output voltage of the power supply means P comprising the alternator 1 and the battery 2. A voltage-raising circuit 11 Is connected between the power supply means P, i.e., a junction of the alternator 1 and the battery 2, and the drive circuit 10 for raising the output voltage of the power supply means P which is fed as a drive voltage to a gate of the MOSFET 5.

With the above arrangement, the output voltage of the battery 2, even if decreased after turning on of the switch 5, is properly raised by the voltage-raising circuit 11 to an appropriate high voltage which is then fed as an operating voltage to the control gate of the switch 5 through the drive circuit 10 to maintain the proper operation of the switch 5. Thus, the switch 5 can continue its proper operation after the switch 5 has been closed, so that the heater 3 can be continuously supplied with electric power from the battery 2 via the normally operating switch 5.

Although in the above description, the switch 5 takes the form of a semiconductor switch such as a MOSFET, it may be constructed of a mechanical switch having a stationary contact and a movable contact electrically operated by an output signal C from the control circuit 6 via the drive circuit 10.

Figure 7:
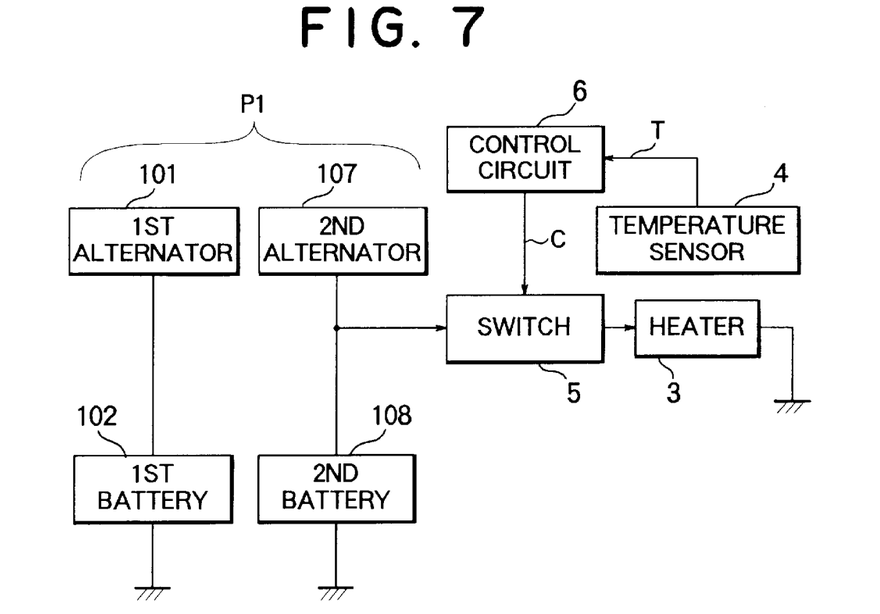
FIG. 7 shows a further embodiment of the invention.

FIG. 7 illustrates a seventh embodiment of the invention. This embodiment is substantially similar to the embodiment of FIG. 1 except for the construction of a power supply means P1. In this embodiment, the power supply means P1 comprises a first or main generator in the form of a first or main alternator 101 and a second or auxiliary generator in the form of a second or auxiliary alternator 107 which are both driven by an engine for generating electric power, and a first or main power storage means in the form of a first or main battery 102 and a second or auxiliary power storage means in the form of a second or auxiliary battery 108 which are connected to the first and second alternators 101, 107, respectively, so as to be thereby charged during engine operation. The first alternator 101 and the first battery 102 serve to supply electric power to an engine control system, whereas the second alternator 107 and the second battery 108 serve to supply a heating means in the form of an electric heater 3 and are electrically separated from the first alternator 101 and the first battery 102. The heater 3 is connected to the second alternator 107 and the second battery 108 through a control switch in the form of an on-off switch 105 so that it is supplied with electric power from the second alternator 107 and the second battery 108 via the switch 5, which is controlled by a control circuit 6 based on a temperature signal T from a temperature sensor 4, for heating an unillustrated automotive part such as a catalytic converter, as in the embodiment of FIG. 1.

Thus, in this embodiment, the power supply to the engine control system is affected by the first alternator 101 and the first battery 102, whereas the power supply to the heater 3 is effected by the second alternator 107 and the second battery 108 which are electrically separate or independent from the first alternator 101 and the first battery 102. Accordingly, the temperature of the heater 3 can be efficiently raised in a short time, as in the embodiment of FIG. 1, while ensuring that sufficient electric power can be supplied to engine control elements such as a starter motor of the engine control system, thereby to provide good engine performance.

The operation of this embodiment other than the above is substantially the same as the FIG. 1 embodiment.

Figure 8:
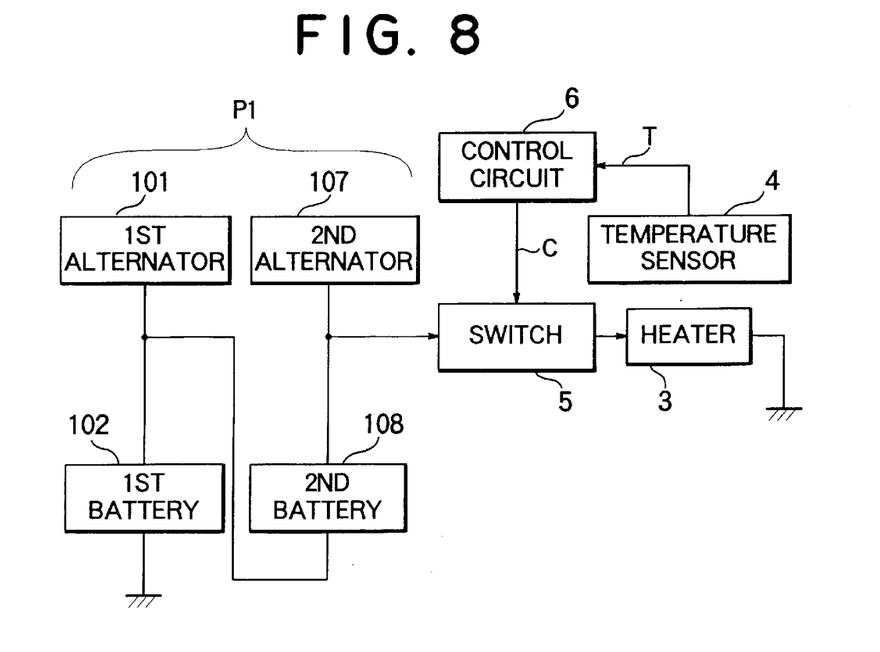
FIG. 8 is similar to FIG. 1, but showing a modified form of the FIG. 7 embodiment.

FIG. 8 is a modification of the FIG. 7 embodiment. This modification is different from the FIG. 7 embodiment in that the second battery 108 is connected in series to the first alternator 101 and the first battery 102 so that the output powers of the first alternator 101 and the first battery 102 can be effectively utilized to supply the heater 3. In this case, in order to charge the second battery 108, it is preferable that the output voltage of the second alternator 107 and the second battery 108 be set to be greater than that of the first alternator 101 and the first battery 102. Specifically, if it is assumed that the output voltage of the first alternator 101 is 12 volts and that the output voltage of the second alternator 107 is 24 volts, then the output voltages of the first and second batteries 102, 108 are both equal to 12 volts, and hence the voltage imposed on the heater 3 is equal to 24 volts. However, the first battery 102 and the second battery 108 can be of the same construction as necessary.

In this modification, too, sufficient power can be supplied from the first alternator 101 and the first battery 102 to the engine control system even during the power supply to the heater 3 is effected.

The operation of this modification other than the above is substantially the same as the embodiment of FIG. 7.

In the embodiments of FIGS. 7 and 8, the first and second alternators 101, 107, which are driven by the same engine, can be constructed into a single unit for space saving.

Figure 9:
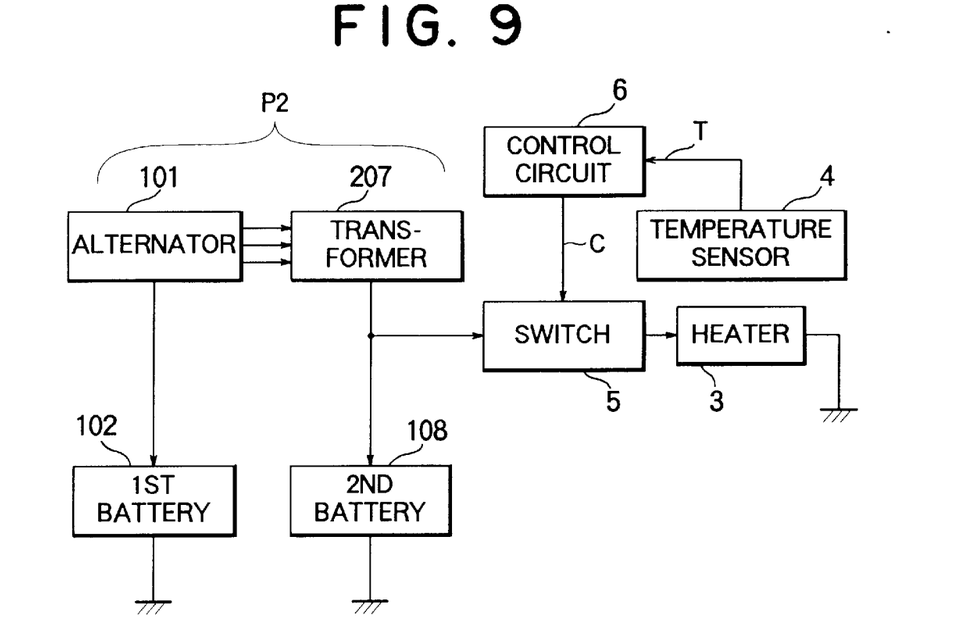
FIG. 9 shows a further embodiment of the invention.

FIG. 9 is a further embodiment of the invention. This embodiment is substantially similar to the embodiment of FIG. 7 except in the construction of a power supply means P2. Specifically, in this embodiment, the second alternator 107 of FIG. 7 is replaced by an amplifying and rectifying means in the form of a three-phase transformer 207 which is connected to the alternator 201 for amplifying and rectifying an AC output voltage of the alternator 101. The output voltages of the three-phase transformer 207 and the second battery 108 are set at a value (e.g., 24 volts) higher than the output voltages (e.g., 12 volts) of the alternator 101 and the first battery 102. For instance, during engine operation, the alternator 101 charges the first battery 102 to a voltage of 12 volts, and generates a three-phase AC voltage which is fed through three-phase wiring to the three-phase transformer 207 where it is amplified and rectified so as to charge the second battery 108 to a voltage of 24 volts.

The operation of this embodiment other than the above is substantially the same as the embodiment of FIG. 7.

Figure 10:
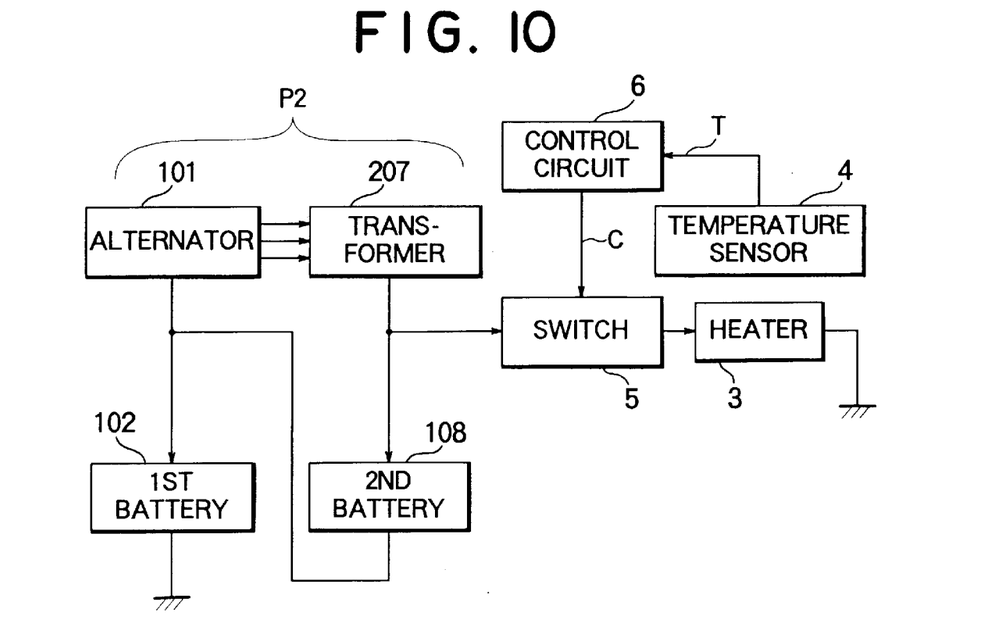
FIG. 10 is similar to FIG. 1, but showing a modified form of the FIG. 9 embodiment.

FIG. 10 illustrates a modification of the FIG. 9 embodiment. This modification is different from the FIG. 9 embodiment in that the second battery 108 is connected in series to the first alternator 101 and the first battery 102 so that the output powers of the first alternator 101 and the first battery 102 can be effectively utilized to supply the heater 3, as in this embodiment of FIG. 8. In this modification, during engine operation, the alternator 101 charges the first battery 102 to a voltage of, for example, 12 volts, and the three-phase transformer 207 properly amplifies and rectifies the output voltage of the alternator 101 so as to charge the second battery 108 to a voltage of 12 volts. As a result, a total voltage of 24 volts (i.e., a total sun of a 12V output voltage of the first battery 102 and a 12V output voltage of the second battery 108) is supplied to the heater 3 via the switch 5. In addition, the first and second batteries 102, 108 can be of the same construction.

Other than the above, the operation of this modification is substantially the same as the embodiment of FIG. 9.

In the embodiments of FIGS. 9 and 10, the three-phase transformer 207, which merely functions to amplify and rectify the three-phase AC output voltage of the alternator 101, takes less space for installation and has a higher degree of freedom for arrangement in comparison with the embodiments of FIGS. 7 and 8.

Furthermore, in the embodiments of FIGS. 9 and 10, in order to take out the three-phase AC power from the alternator 101 into the three-phase transformer 207, there are required three-phase windings for voltage amplification which are connected to the transformer 207 and which are disposed in opposed relation with respect to three-phase AC windings in the alternator 101. The three-phase windings for voltage amplification can be incorporated in the alternator 101, or they can be formed separately from the alternator 101 in such a manner that they are disposed in opposed relation with the three-phase windings in the alternator 101. Specifically, in case of the three-phase windings for voltage amplification incorporated in the alternator 101, a 12V AC voltage can be taken out from three-phase output terminals of the alternator 101, then amplified to a voltage of 24V and rectified by the three-phase transformer 207. On the other hand, in case of the separate arrangement, the separately arranged three-phase windings perform voltage amplification and output an amplified AC voltage of 24V, so the transformer 217 need not have a voltage-amplifying function but have a rectifying function alone.

Figure 11:
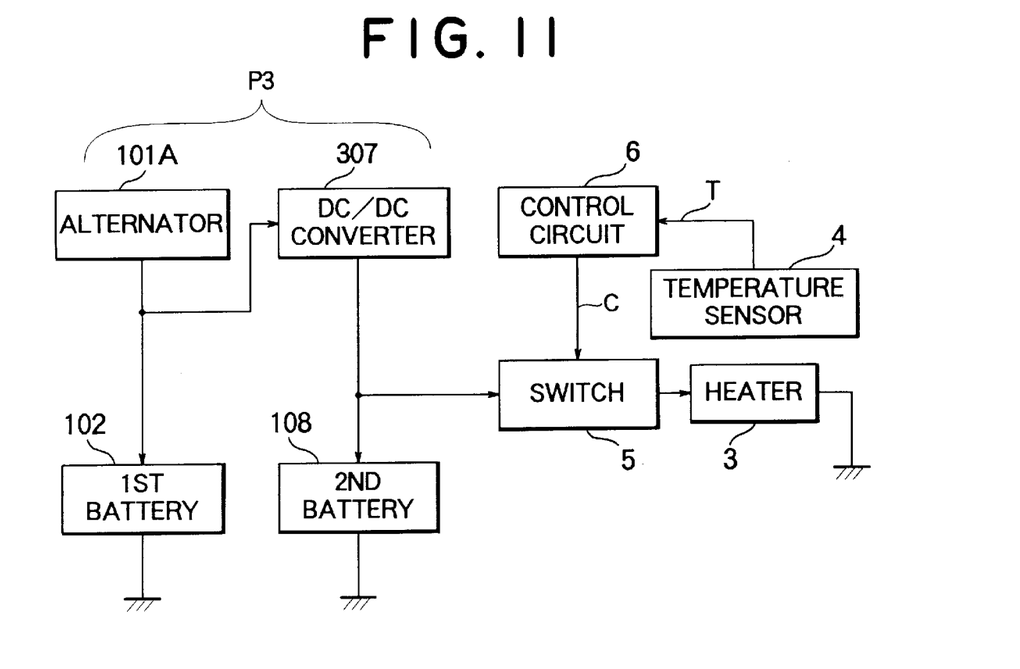
FIG. 11 shows a further embodiment of the invention.

FIG. 11 illustrates a further embodiment of the invention. This embodiment is substantially similar to the embodiment of FIG. 9 except for the construction of a power supply means P3. Namely, in this embodiment, the amplifying and rectifying means 207 of FIG. 9 is replaced by an amplifying means in the form of a DC/DC converter 307 which is connected in series to a generator in the form of an alternator 101A and the first battery 102 for amplifying DC output voltages thereof. In this embodiment, during engine operation, the alternator 101A generates a DC voltage. The output voltages of the DC/DC converter 307 and the second battery 108 are set at a value (e.g., 24 volts) higher than the output voltages (e.g., 12 volts) of the alternator 101A and the first battery 102. For instance, during engine operation, the alternator 101A charges the first battery 102 to a voltage of 12 volts, and generates a DC voltage which is fed to the DC/DC converter 307 where it is amplified so as to charge the second battery 108 to a voltage of 24 volts. When the engine is out of operation, the output voltage of the first battery 102 is amplified by the DC/DC converter 307 to charge the second battery 108.

In this embodiment, the DC/DC converter 307, which merely functions to amplify the DC output voltage of the alternator 101A, takes less space for installation and has a higher degree of freedom for arrangement in comparison with the embodiments of FIGS. 7 and 8. Moreover, during engine stoppage, the second battery 108 can be charged by the first battery 102 via the DC/DC converter 307.

The operation and construction of this embodiment other than the above are substantially the same as the embodiment of FIG. 7.

Figure 12:
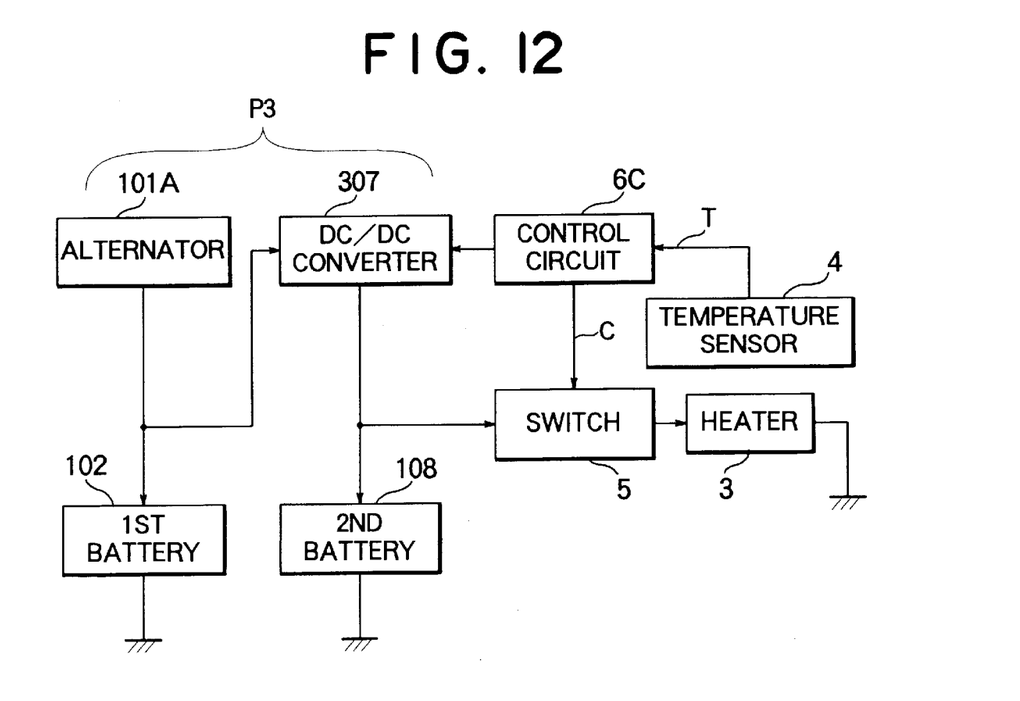
FIG. 12 shows a further embodiment of the invention.

FIG. 12 illustrates a further embodiment of the invention which is different from the embodiment of FIG. 11 in the construction of a control means 6C. Namely, the control means 6C includes a voltage-controlling means which is connected to the amplifying means in the form of the DC/DC converter 307 for controlling the output voltage thereof such that the output voltage of the DC/DC converter 307 is higher than the output voltage of the second power storage means in the form of the second battery 108 by a predetermined value when the latter is being charged.

In this embodiment, when the switch 5 is turned off by the control means 6C based on an temperature signal T from the temperature sensor 4 after an unillustrated automotive part has been sufficiently heated above a predetermined temperature, the second battery 108 is charged for recovery by the alternator 101A or the first battery 102 through the DC/DC converter 307. At this time, the voltage-raising means in the control means 6C senses the output voltage of the second battery 108 and the temperature therearound, and determines whether the temperature thus sensed is less than a prescribed threshold value below which the charging capacity of the second battery 108 is deteriorated. Such a threshold value is predetermined on the basis of a temperature-dependent charging characteristic of the second battery 108. If so, the voltage-raising means raises the output voltage (e.g., around 24–26 volts in the normal state) of the DC/DC converter 307 by a predetermined value (e.g., 6 volts). Accordingly, the second battery 108 is quickly charged by the thus raised output voltage from the DC/DC converter 307 in a short time. The control means 6C determines, based on the magnitude of the output voltage of the second battery 108 or the duration of charging, whether the charging to the second battery 108 has been completed. Upon completion of the charging, the control means 6C returns the output voltage of the DC/DC converter 307 to the original or normal level. This is because it is undesirable to impose an unnecessarily high voltage on the fully charged battery 108.

Other than the above, the construction and operation of this embodiment are substantially the same as the embodiment of FIG. 11.

Figure 13:
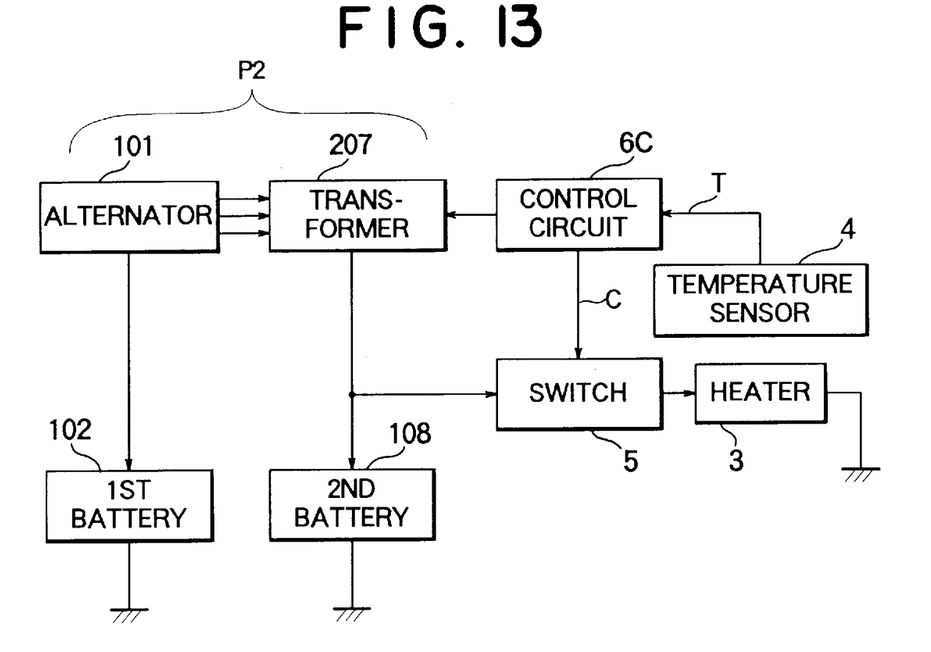
FIG. 13 shows a further embodiment of the invention.

FIG. 13 shows a further embodiment of the invention which is substantially similar to the embodiment of FIG. 12 except in that the amplifying means 307 is replaced by an amplifying and rectifying means in the form of a three-phase transformer 207 which amplifies and rectifies a three-phase AC output voltage of a generator in the form of an alternator 101. This embodiment provides substantially the same advantages as obtained by the FIG. 12 embodiment. In this embodiment, the three-phase transformer 207 includes a plurality of winding change-over taps for changing the number of valid turns of the winding. Thus, the winding change-over taps constitute part of the voltage-raising means. During engine stoppage, the three-phase transformer 207 is unable to charge the second battery 108, but the first battery 102 is separated from the second battery 108 so that excessive reduction in the output voltage of the first battery 102 is reliably prevented during the time the power supply to the heater 3 is being effected by the second battery 108 through the switch 5.

What is claimed is:

1. A power supplying apparatus for automotive parts, comprising:
   a) power supply means including a generator driven by an engine for generating electric power; and first power storage means connected to said generator so as to be charged thereby during engine operation;
   b) heating means for heating said automotive parts;
   c) a first switch connected between said power supply means and said heating means for selectively switching on and off the power supply from said power supply means to said heating means;
   d) a temperature sensor for sensing the temperature of the automotive parts; and
   e) control circuit means for controlling the first switch in accordance with an output signal from the temperature sensor.

2. A power supplying apparatus for automotive parts according to claim 1, wherein the control circuit means controls said first switch in such a manner that said first switch is turned off for preventing the power supply from said power supply means to said heating means at the time of engine cranking.

3. A power supplying apparatus for automotive parts according to claim 1, further comprising amplifying means (9) connected between said control circuit means and said first switch for amplifying a control signal supplied from said control circuit means to said first switch.

4. A power supplying apparatus for automotive parts, comprising:
   a) power supply means including a generator driven by an engine for generating electric power; and first power storage means connected to said generator so as to be charged thereby during engine operation;
   b) heating means for heating said automotive parts;
   c) a first switch connected between said power supply means and said heating means for selectively switching on and off the power supply from said power supply means to said heating means;
   d) a temperature sensor for sensing the temperature of the automotive parts; and
   e) control circuit means for controlling the first switch in accordance with an output signal from the temperature sensor;
   wherein the control circuit means controls said first switch in such a manner that said first switch is turned off for preventing the power supply from said power supply means to said heating means at the time of engine cranking; and
   wherein said power supply means further comprises:
      second power storage means (7) connected to said generator so as to be charged thereby during engine operation, said first power storage means being connected to said generator and to said heating means through said first switch, said second power storage means being connected to said heating means through said first switch; and
      a second switch (8) connected between said generator and said second power storage means and between said first power storage means and said first switch for controlling electrical connection therebetween, said second switch being controlled by said control circuit means.

5. A power supplying apparatus for automotive parts according to claim 3, wherein said amplifying means comprises:
   a drive circuit connected between said control means and said first switch for turning said first switch on in response to the control signal from said control means, said drive circuit being operated by an output voltage of said power supply means; and
   a voltage-raising circuit connected between said power supply means and said drive circuit for raising the output voltage of said power supply means fed to said drive circuit.

6. A power supplying apparatus for automotive parts according to claim 5, wherein said second switch comprises a cut-off switch which is switched off by said control circuit means to cut off electrical connection between said first power storage means and said heating means during engine cranking.

7. A power supplying apparatus for automotive parts according to claim 5, wherein said second switch comprises a change-over switch which is selectively switched over by said control circuit means between a first condition in which said first and second power storage means are connected in series to each other, and a second condition in which said first and second power storage means are connected in parallel to each other.

8. A power supplying apparatus for automotive parts according to claim 6, wherein said change-over switch is controlled by said control circuit means such that it takes the first condition when the temperature of said automotive parts is less than a predetermined value, and the second condition when the temperature of said automotive parts exceeds the predetermined value.

9. A power supplying apparatus for automotive parts according to claim 7, wherein said change-over switch is controlled by said control circuit means such that it takes the first condition when the required power of said heating means is equal to or less than a predetermined value, and the second condition when the required power is greater than the predetermined value.

10. A power supplying apparatus for automotive parts, comprising:
   a) a first generator (101) and a second generator (107) being both driven by an engine for generating electric power;
   b) first (102) and second (108) power storage means connected to said first and second generators, respectively, so as to be charged thereby during engine operation;
   c) heating means for heating said automotive parts;
   d) a switch connected between said heating means and said second generator and between said heating means and said second power storage means for selectively switching the power supply to said heating means on and off;
   e) a temperature sensor for sensing the temperature of the automotive parts: and
   f) control circuit means connected to said switch for selectively turning said switch on and off in response to an output signal of said temperature sensor.

11. A power supplying apparatus for automotive parts according to claim 10, wherein the output power of said second generator is greater than that of said first generator, and the output power of said second power storage means is greater than that of said first power storage means.

12. A power supplying apparatus for automotive parts according to claim 10, wherein said second power storage means is separated from said first generator and said first power storage means.

13. A power supplying apparatus for automotive parts according to claim 10, wherein said second power storage means is connected in series to said first power storage means and also to said first generator so as to be thereby charged.

14. A power supplying apparatus for automotive parts according to claim 13 , wherein said first and second generators are formed into an integral unit.

15. A power supplying apparatus for automotive parts, comprising:
   a) a generator (101) driven by an engine for generating an AC output voltage;
   b) first power storage means connected to said generator so as to be charged thereby during engine operation;
   c) amplifying and rectifying means (207) connected to said generator for amplifying and rectifying the AC output voltage of said generator;
   d) second power storage means (108) connected to said amplifying and rectifying means so as to be charged thereby;
   e) heating means for heating said automotive parts;
   f) a switch connected between said heating means and said amplifying and rectifying means and between said heating means and said second power storage means for selectively switching the power supply to said heating means on and off;
   g) a temperature sensor for sensing the temperature of the automotive parts: and
   h) control circuit means connected to said switch for selectively turning said switch on and off in response to an output signal of said temperature sensor.

16. A power supplying apparatus for automotive parts according to claim 15, wherein said second power storage means is connected in series to said first power storage means and to said generator so an to be charged thereby.

17. A power supplying apparatus for automotive parts according to claim 15, wherein said control circuit means includes voltage-controlling means which is connected to said amplifying and rectifying means for controlling the output voltage thereof such that the output voltage of said amplifying and rectifying means is higher than the output voltage of said second power storage means by a predetermined value when the latter is being charged.

18. A power supplying apparatus for automotive parts, comprising:
   a) a generator driven by an engine for generating an AC voltage;
   b) first power storage means connected to said generator so as to be charged thereby during engine operation;
   c) amplifying means (307) connected to said first power storage means for amplifying the output voltage thereof;
   d) second power storage means connected to said amplifying means so as to be charged thereby;
   e) heating means for heating said automotive parts;
   f) a switch connected between said heating means and said amplifying means and between said heating means and said second power storage means for selectively switching the power supply to said heating means on and off;
   g) a temperature sensor for sensing the temperature of the automotive parts: and
   h) control circuit means connected to said switch for selectively turning said switch on and off in response to an output signal of said temperature sensor.

19. A power supplying apparatus for automotive parts according to claim 18, wherein said second power storage means is connected in series to said first power storage means and to said generator so as to be charged thereby.

20. A power supplying apparatus for automotive parts according to claim 18, wherein said control circuit means includes voltage-controlling means which is connected to said amplifying means for controlling the output voltage thereof such that the output voltage of said amplifying means is higher than the output voltage of said second power storage mesas by a predetermined value when the latter is being charged.

* * * * *